US012681949B1

(12) United States Patent
Stephani

(10) Patent No.: US 12,681,949 B1
(45) Date of Patent: Jul. 14, 2026

(54) SYSTEM AND METHOD FOR DATABASE ASSESSMENT AND MANAGEMENT

(71) Applicant: Sentry Insurance Company, Stevens Point, WI (US)

(72) Inventor: Dennis Stephani, Stevens Point, WI (US)

(73) Assignee: Sentry Insurance Company, Stevens Point, WI (US)

( * ) Notice: Subject to any disclaimer, the term of this patent is extended or adjusted under 35 U.S.C. 154(b) by 136 days.

(21) Appl. No.: 17/411,420

(22) Filed: Aug. 25, 2021

(51) Int. Cl.
| | |
|---|---|
| G06F 16/25 | (2019.01) |
| G06F 16/178 | (2019.01) |
| G06F 16/21 | (2019.01) |
| G06F 16/215 | (2019.01) |
| G06F 21/60 | (2013.01) |

(52) U.S. Cl.
CPC ........ G06F 16/258 (2019.01); G06F 16/1794 (2019.01); G06F 16/213 (2019.01); G06F 16/215 (2019.01); G06F 21/606 (2013.01)

(58) Field of Classification Search
CPC .... G06F 16/258; G06F 16/215; G06F 16/213; G06F 21/606; G06F 16/1794
See application file for complete search history.

(56) References Cited

U.S. PATENT DOCUMENTS

| | | | | |
|---|---|---|---|---|
| 9,990,365 B1 * | 6/2018 | Kilpatrick | ............ | G06F 16/168 |
| 2008/0307343 A1 * | 12/2008 | Robert | .................... | G06F 16/48 |
| | | | | 715/765 |
| 2009/0106674 A1 * | 4/2009 | Bray | ..................... | G06F 16/156 |
| | | | | 715/762 |
| 2016/0248803 A1 * | 8/2016 | O'Connell | ............ | G06F 16/285 |
| 2017/0169046 A1 * | 6/2017 | Molnar | .................... | G06F 16/16 |
| 2017/0249347 A1 * | 8/2017 | Mertens | ............. | G06F 16/2322 |
| 2017/0315979 A1 * | 11/2017 | Boucher | ............. | G06F 3/04847 |
| 2018/0218167 A1 * | 8/2018 | Narayanaswamy | ......................... | |
| | | | | H04L 63/0435 |
| 2019/0129544 A1 * | 5/2019 | Kirigin | .................. | G06F 3/048 |
| 2020/0050594 A1 * | 2/2020 | Tidwell | ................... | G06F 21/55 |
| 2020/0050966 A1 * | 2/2020 | Enuka | .................... | G06Q 10/10 |
| 2020/0162516 A1 * | 5/2020 | Israel | ................... | G06F 21/566 |
| 2020/0250184 A1 * | 8/2020 | Frampton | ............ | H05K 999/99 |
| 2020/0394660 A1 * | 12/2020 | Brooks | .................. | G06Q 30/01 |
| 2021/0176201 A1 * | 6/2021 | Le Jouan | ................ | H04L 51/48 |

* cited by examiner

*Primary Examiner* — Kavita Stanley
*Assistant Examiner* — Lin Lin M Htay
(74) *Attorney, Agent, or Firm* — Foley & Lardner LLP

(57) ABSTRACT

A system includes a first computing device, a second computing device, and a third computing device. The first computing device is configured to aggregate data from one or more computing devices throughout the system in a secure manner. The second computing device is configured to pull instructions from a memory file of the first computing device and store instructions in a second memory file of the second computing device. The third computing device is further configured to pull the instructions from the second memory file, determine data values based on the instructions, and push the data to the second computing device. The second computing device is configured to aggregate the data from one or more third computing devices and push the data to the third computing device.

21 Claims, 3 Drawing Sheets

SYSTEM AND METHOD FOR DATABASE ASSESSMENT AND MANAGEMENT

TECHNICAL FIELD

The present disclosure relates, in general, to integrating independent platforms. More particularly, the present disclosure relates to facilitating communication between independent platforms.

BACKGROUND

The following description is provided to assist the understanding of the reader. None of the information provided or references cited is admitted to be prior art. Many companies and organizations have multiple independent systems that are used to provide a service to customers. In some cases, companies and organizations merge or acquire other existing companies or organizations that have one or more independent platforms. However, the independent systems may have sensitive data stored thereon that cannot merely be copied or retrieved for security reasons. Thus, facilitating information between the independent systems can be complex and difficult to maintain.

SUMMARY

An illustrative system includes a first computing device, a second computing device, and a third computing device. The first computing device is configured to aggregate data from remote computing devices such as the second and third computing devices throughout the system. The second computing device is configured to serve as a relay device to remote computing devices throughout the network such as the third computing device. The third computing device is configured to pull instructions from a memory file of the second computing device, determine requested data based on the instructions, and push the data to the second computing device. The particular steps allow for enhanced network security during data collection throughout a computing environment.

An illustrative computing device includes a transceiver configured to communicably couple the computing device to a network, a memory having application data relating to one or more customers stored thereon, and a processor operatively coupled to the memory and the transceiver. The processor is configured to pull instructions from a second computing device on the network, determine requested data based on the instructions, the requested data comprising a plurality of data fields, determine values for each of the plurality of data fields using the application data, and push the requested data to the second computing device.

An illustrative computing-implemented method includes determining, by a first computing device, instructions, the instructions including an indication of requested data, pulling, by a second computing device from the first computing device, the instructions, pulling, by a third computing device from the second computing device, the instructions, determining, by the third computing device, values for the requested data based on the instructions, pushing, by the third computing device to the second computing device, the values, and pushing the values by the second computing device to the first computing device.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
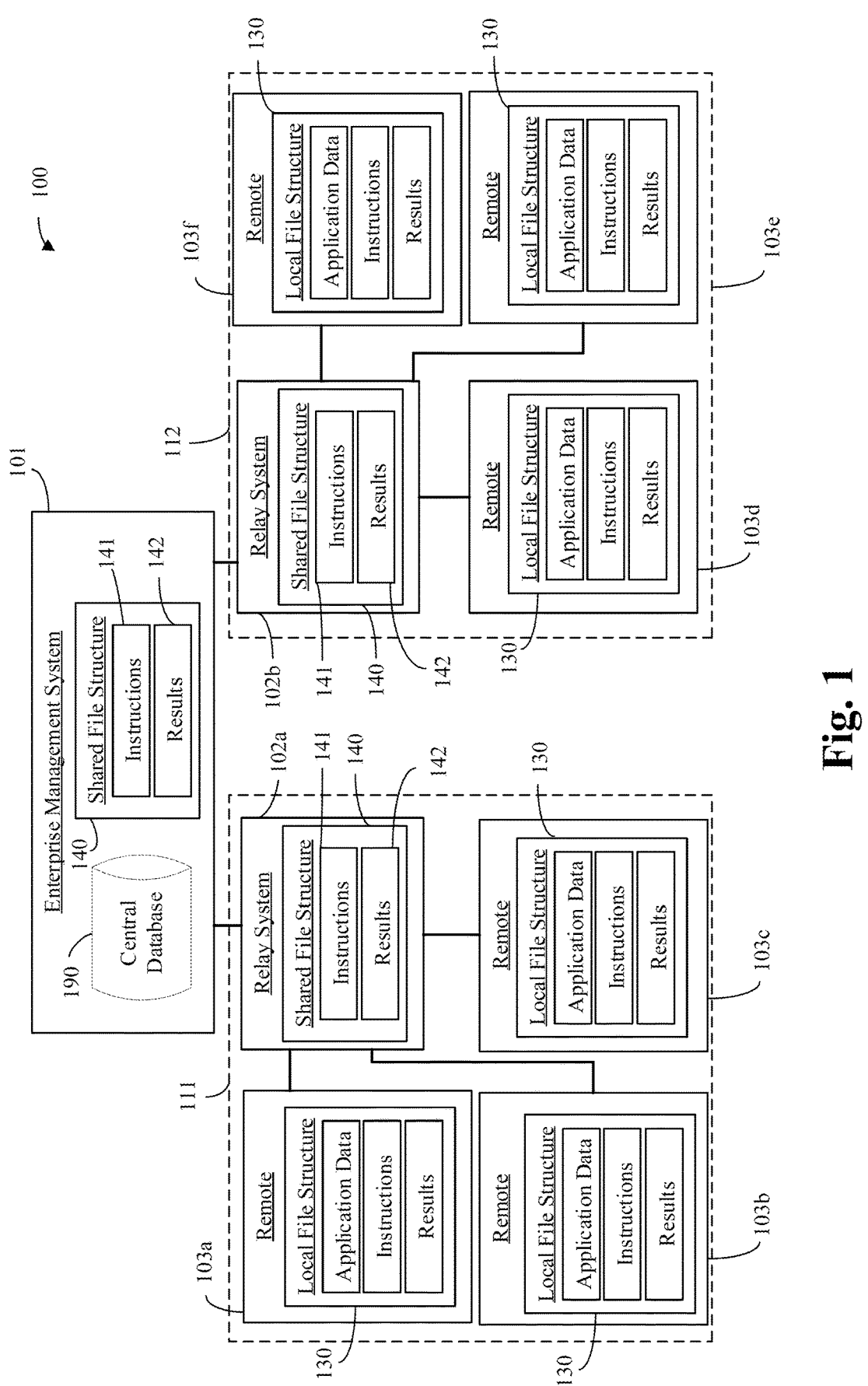
FIG. 1 is a block diagram of a processing system in accordance with an illustrative embodiment.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Many organizations have multiple computer networks or systems that work in concert to provide a service to customers. Oftentimes, organizations automate or computerize multiple specific tasks using a discrete program or computer system for each task. For example, as computers and computer programs become more advanced, organizations are automating more advanced tasks. Over time, an organization can accumulate multiple individual systems that each execute respective computer applications in order to provide one or more services to their customers.

In many instances, the individual systems were each originally designed to perform a particular function in order to provide a particular service to customers. Accordingly, the individual systems may each include data stored locally that was collected, for example, as part of providing the particular service. Moreover, an organization or company may acquire or merge with other organizations or companies that have particular data stored for the existing customers at independent platforms. The data at each independent platform may need to be collected at a common collection point in order for the organization to assess the state of the organization and/or maintain regulatory compliance. However, the particular data stored at the independent platforms may include confidential data such as personal credit information (PCI) or personal health information (PHI) that is secured behind networking firewalls.

Thus, effectively facilitating proper and secure communication between an organization's computer systems and programs can become difficult and complex over time as the organization adapts to advancing technology. For example, each time that a new application is added to a network of systems or each time that a new information sharing communication connection is made between applications, a main server or computing device for the organization implement a particular protocol in order to retrieve and store the data from each of the applications locally. Moreover, over time, the main server may retrieve and store the data from each independent platform and/or application in order to maintain an up to date database. The protocol implemented in this disclosure ensures that the integrity and security of the data (e.g., confidential data) is maintained and the security integrity of the independent platforms behind respective firewalls is also maintained.

For example, the protocol implemented may utilize a unique computing architecture having a tier of devices that ensure the security integrity of the data transfers over the network. The computing architecture includes an enterprise management system coupled to one or more relay systems that are further connected to one or more respective remote server systems. The remote server systems are configured to run one or more computing applications to provide a service to one or more customers. In turn, the data from the one or more customers is stored locally on the respective remote server. The relay system is configured to operate between the enterprise management system and the remote server systems and navigate the firewalls between the enterprise management system and the remote servers. Moreover, the relay system may serve as a de-centralized data collection point for one or more geographically isolated remote server systems thereby reducing network traffic and increasing efficiency of the architecture. The enterprise management system is configured to act as a central server point for the enterprise and aggregate the data from the multiple remote servers that may be located within the network within respective high security zones (e.g., behind one or more firewalls As a brief exemplary summary, the enterprise management system generates and stores instructions within a folder, the relay systems pull the instructions upon detecting their presence and store instructions within a second folder local to the relay system, the respective remote server systems pull the instructions from the second folder upon detecting their presence and execute the instructions to create a results folder. The remote servers push respective results folders to a respective relay system which then pushes the results folders to the enterprise management system. The enterprise management system then processes the received results folder, for example, line by line and updates a local database. In some embodiments, the local database stores the data in attributes instead of a structured table, which enables the local database to be dynamic in storing updated data received from the remote servers, for example, on a periodic basis. In this way, data from the various independent platforms of the enterprise can be aggregated and processed in a secure and efficient manner.

FIG. 1 is a block diagram of a processing system in accordance with an illustrative embodiment. An illustrative processing system 100 includes an enterprise management system 101 (e.g., a custodian system), one or more relay systems 102a-b (e.g., watchman systems), and one or more remote server systems 103a-f (e.g., independent platforms). In alternative embodiments, additional, fewer, and/or different elements may be used. For example, various embodiments and examples described herein relate to an insurance company. However, the disclosure is not meant to be limited to insurance companies but can be easily adapted for use in any suitable system.

The various elements illustrated in FIG. 1 can communicate with one another using any suitable communication protocol. For example, some elements may communicate using a unique communication protocol. Communication between the elements can be wired or wireless. The communication can be via one or more networks, such as a local area network (LAN), a wide area network (WAN), direct communications, the Internet, etc.

The processing system 100 can be used to provide services to customers. For example, in the context of an insurance company, the processing system 100 can be used to provide services related to insurance products. An illustrative first remote server system 103a may include a health insurance policy management system that manages health insurance policies and/or quotes for insurance policies. For example, the first remote server system 103a can facilitate initiating a new policy, qualify potential policy holders, provide quotes, issue policies, maintain policies (e.g., report premiums, perform audits, etc.), facilitate changes to policies, renew policies, etc. As another example, a second remote server system 103b may include a life insurance policy management system. In yet another example, a third remote server system 103c may include a life insurance policy management system acquired by the organization from a third-party organization. Although in these examples the remote servers are explained as relating to managing insurance policies, the remote servers can be any suitable computing device for any other industry, sector, purpose, etc. The remote servers 103a-f include a local file structure 130. The local file structure 130 may include one or more databases stored within a local memory device. The one or more databases include application data acquired by the respective remote server 103a-f, for example, via the performance of providing a respective service to customers.

The relay systems 102a-b are located between the enterprise management system 101 and respective remote server systems 103a-f. In some embodiments, the relay systems 102a-b are configured to navigate any firewalls between the enterprise management system 101 and the respective remote server systems 103a-f. In some embodiments, the relay systems 102a-b are configured to navigate communication between geographically separated remote server systems 103a-f. For example, the relay systems 102a-b may be utilized between geographically separated remote server systems 103a-f to reduce the wide area network (WAN) traffic thereby increasing the efficiency of the processing environment.

An illustrative first relay system 102a is communicably coupled to a first set of the remote server systems 103a-c. A second relay system 102b is communicably coupled to a second set of the remote server systems 103d-f. In alternative embodiments, additional or fewer relay systems 102a-b may be implemented depending on the compatibility of data structures and applications of a set of the remote server systems 103a-f. The first and second relay systems 102a and 102b are also communicably coupled to the enterprise management system 101.

In the illustrative example of FIG. 1, the first relay system 102a, the first remote server system 103a, the second remote server system 103b, and the third remote server system 103c are within a first security zone 111 (e.g., behind one or more firewalls). Moreover, the second relay system 102b and the second set of the remote server systems 103c-f are within a second security zone 112. In some embodiments, the second remote server system 102b may not include confidential information and not be in a security zone. That is, in various embodiments, the remote server systems 103a-f, the relay systems 102*a-b*, and the enterprise management system 101 may each be located within respective security zones (e.g., networking high security zones including firewalls) based on the network security needed determined based on the structure, location, and application of each of the respective systems.

The enterprise management system 101 and the relay server systems 102*a-b* include a file structure 140, for example, structured as a file share. The file structure 140 is located on a memory device of the respective system. The file structure 140 and a local file structure 130 of the remote server systems 103*a-b* may each include an instructions folder 141 and a results folder 142. The instructions folder 141 may include or store computer readable instructions, for example, in a JavaScript Object Notation (JSON) or similar format that are retrievable from the relay systems 102*a-b* and/or the remote server systems 103*a-f*. The instructions folder 141 include instructions of what data is to be captured (or executed) on the remote server systems 103*a-f*. The results folder 142 is structured to store the data that is returned from the remote server systems 103*a-f* and is described in greater detail herein.

For networking security, the enterprise management system 101 is designated as the highest service, the relay systems 102*a-b* are designated as the median service, and the remote server systems 103*a-f* are designated as the lowest service. That is, each of the systems of the processing system 100 are designated with priorities within a hierarchy that ensure that security zones 111-114 are not compromised. A system with the higher service does not reach out to a lower service. For example, the enterprise management system 101 will never port through a respective security zone (e.g., via a firewall port) to push or pull files to a respective relay system 102*a-b*. Further, the relay systems 102*a-b* do not push or pull files to the remote server systems 103*a-f*. This ensures that the security opening between the respective systems are minimal and controlled because only one port is opened for communication and the lower systems (e.g., which have the confidential data) are the only ones pushing or pulling data to the higher systems. For example, this may ensure that a remote server system 103*a-f* that includes confidential data does not get spoofed by a request from a fraudulent computing device attempting to retrieve the data.

Figure 2:
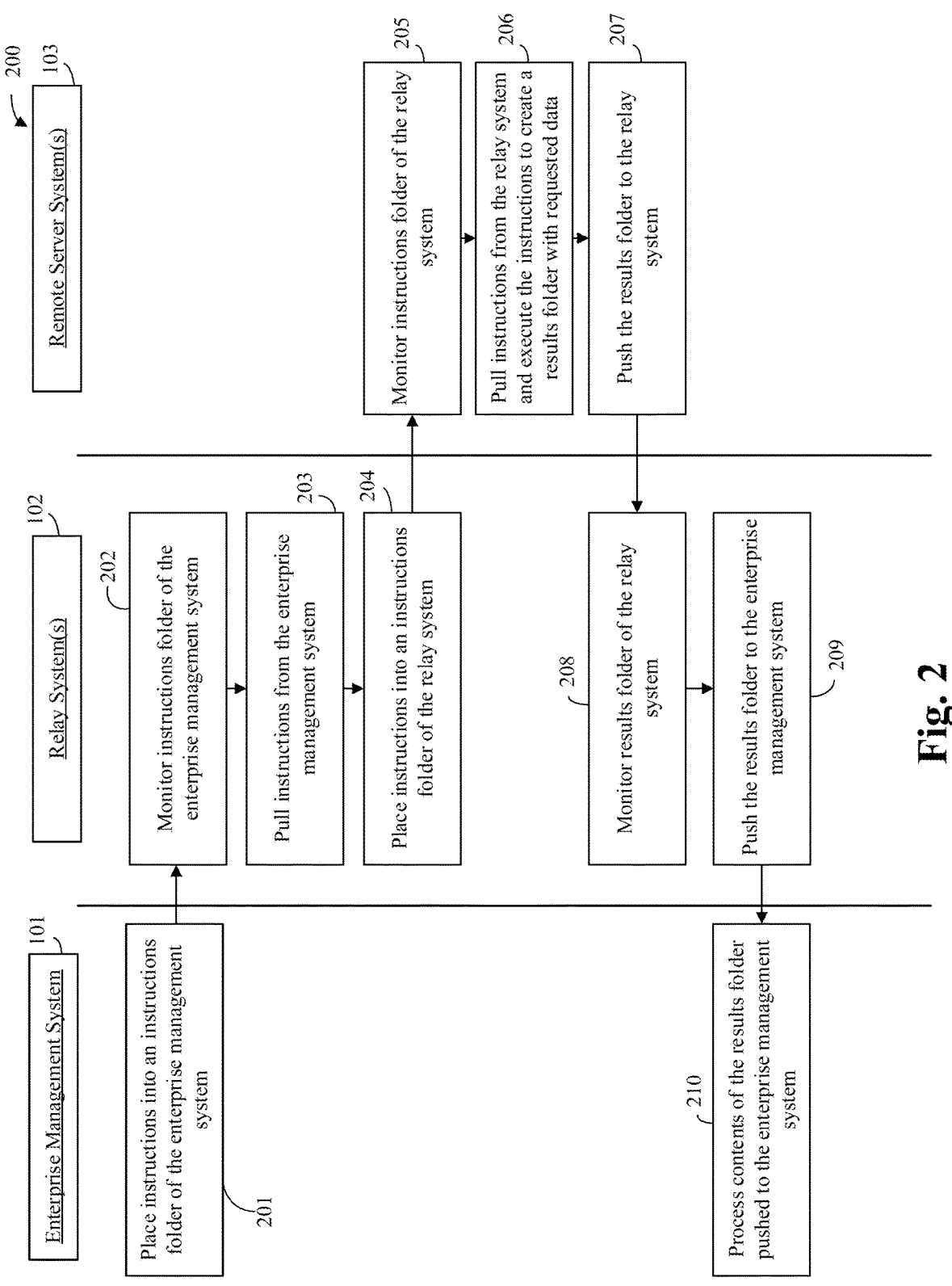
FIG. 2 is a flow diagram of a method for integrating platforms in accordance with an illustrative embodiment.

FIG. 2 is a flow diagram of a method 200 for integrating platforms via collecting data at a common collection point in accordance with an illustrative embodiment. In alternative embodiments, additional, fewer, and/or different operations may be performed. Also, the use of a flow diagram and arrows is not meant to be limiting with respect to the order or flow of operations. For example, one or more operations may be performed simultaneously. The operations described throughout FIG. 2 may be performed by the respective computing systems, for example, a processor executing machine-readable instructions stored on memory of one or more respective computing devices such as the computing device described in reference to FIG. 3. For example, each device or system may have respective scripts or code written in various languages such as PowerShell scripting language, SQL server's query language (TSQL), C sharp (C#), and so on that cause the pushing, pulling, and/or window services described herein.

In some embodiments, the method 200 generally includes the enterprise management system 101 collecting data from one or more of the remote server systems 103*a-f* in a controlled and secure manner. For example, the enterprise computing management system 101 may be triggered to retrieve data from various portions of the processing system 101 either automatically (e.g., on a periodic basis) or manually (via a manual request). The enterprise management system 101 may then generate computer-readable instructions including an indication of the particular data to be retrieved and/or an indication of which remoter server system 103*a-c* that data should be returned from and store the computer-readable instructions within the instructions folder 141 of the enterprise management system 101. The relay systems 102*a-b* retrieve the computer-readable instructions. One or more of the remote server systems 103*a-f* retrieve the computer-readable instructions from a respective relay system 102*a-b* and execute the computer-readable instructions. In response to executing the instructions, the respective remote server system 103*a-b* accesses and/or generates data from the local file structure 103 and pushes the data back to a results folder 142 of the respective relay system 102*a-b*, which may then push the data to a results folder 142 of the enterprise management system 101.

In an operation 201, the enterprise management system 101 places computer-readable instructions into an instructions folder 141 of a file structure 140 either automatically or based on a manual request. For example, the enterprise management system 101 may receive the manual request, from an authenticated user via a graphical user interface (GUI) displayed on a computing device, to compile data from one or more of the remote server systems 103*a-f*. In response to the manual request, the enterprise management system 101 may generate the computer-readable instructions and stores them in the instructions folder 141. In some embodiments, the manual request may include the computer-readable instructions that are then stored within the instructions folder. In yet another example, in response to the manual request, the enterprise management system 101 may identify and retrieve the computer-readable instructions from a database and move them to the instructions folder 141 based on the type and location of data requested.

Moreover, in some embodiments, the enterprise computing device 101 may automatically, for example, on a predetermined periodic time basis, generate or retrieve the computer-readable instructions and store them within the instructions folder 141 in order to aggregate the data stored throughout various portions of the processing system 100 according to a pre-defined schedule. In various embodiments, the computer-readable include an indication of particular data fields to retrieve from one or more of the remote server systems 103*a-c*.

In an operation 202, the relays systems 102*a-b* monitor the instructions folder of the enterprise management system 101. In some embodiments, the relay systems 102*a-b* monitor the instructions folder of the enterprise management system by running an event listener service. In some embodiments, the relay systems 102*a-b* may poll or ping the enterprise management system 101 on a periodic bases to monitor the instructions folder. The enterprise management system 101 may not ping the relay systems 102*a-b*, rather the relay systems 102*a-b* monitor the enterprise management system 101, which may the potential of the relay systems 102*a-b* being spoofed by a fraudster. In various embodiments, the network address of the enterprise management system 101 may be hard coded into each of the relay systems 102*a-b* in order for the relay systems 102*a-b* to monitor the instructions folder of the enterprise management system 101.

Upon detecting that instructions have been placed into the instructions folder of the enterprise management system 101, the relay systems 102*a-b* pulls (e.g., retrieves) the computer-readable instructions from the enterprise management system at process 203. For example, the relay systems 102*a-b* may port through a security zone (e.g., firewall) established between the respective relay system 102*a* or 102*b* in order to access and retrieve (e.g., pull) the computer-readable instructions from the instructions folder 141 of the enterprise management system 102. In some embodiments, the instructions within the instructions folder of the enterprise management system 101 may be pulled in a first-in first-out (FIFO) queue and, via multiple threads, copied from the enterprise management system 101 to the relay systems 102*a-b*. The respective relay system may then store the computer-readable instructions within an instructions folder 141 of the relay system at process 204. In some embodiments, the relay system 102*a* or 102*b* may determine, based on an array list within the instructions, that none of the connected remote server systems are within the array list. In such an embodiment, the respective relay system 102*a* or 102*b* can inject additional information into the instruction file (such as the relay machine name, or a zone name) that the remote system may find helpful. However, the main purpose of the relay system is to move files between the master server (e.g., the enterprise management system) and remote servers (e.g., the remote server systems). This way, only one security opening needs to be made with that one relay server and the master file share. This is much better than opening multiple security ports for each of the remote servers.

In an operation 205, the remote server systems 103*a-f* monitor the instructions folder of the respective relay system 102*a* or 102*b*. In some embodiments, the remote server systems 103*a-f* monitor the instructions folder of the respective relay system 102*a* or 102*b* by running an event listener service. In some embodiments, the remote server systems 103*a-f* may poll or ping the respective relay system 102*a* or 102*b* on a periodic bases to monitor the instructions folder. In various embodiments, the network address of a relay system 102*a* or 102*b* is hardcoded into the respective remote server systems 103*a-f* for them to open a file sharing port and monitor the instructions folder.

In an operation 206, the remote server systems 103*a-f* retrieve and execute the computer-readable instructions from a respective relay system 102*a* or 102*b*. In various embodiments, the instructions generated by the enterprise management system 101 are percolated to every remote server system 103*a-f* and the respective remote server system 103*a-f* determines the applicability of the instructions to the respective remote server system 103*a-f*. The instruction file includes a list of all remote server system expected to execute the instructions. The remote server system will receive the instruction file, check to see if it is in the list of targeted servers, and if so, execute the code. For example, the first remote server system 103*a* may pull and execute the instructions from the instructions folder first relay system 102. In response to pulling and/or executing the instructions, the first remote server system 103*a* may determine that the instructions are not applicable to the first remote server system 103*a* (e.g., that the first remote server system 103*a* does not have the requested data or the remote server is not within an array list of servers in the instructions). In this example, the first remote server system 103*a* may not perform additional operations or may generate a results folder that is empty.

In another example, in response to pulling and/or executing the instructions, the first remote server system 103*a* determines that the first remote server system 103*a* does have the requested data stored. In response, the first remote server system 103 identifies and access the requested data within the local file structure 130, aggregates and/or formats the requested data based on the instructions, and stores the requested data within a results folder 142 of the file structure 130. For example, the data and/or file may be compiled and named such that the enterprise management server 101 is able to determine which process (e.g., script or executable) to use in order to extrapolate and process the data as explained below. In some embodiments, the requested data is encrypted, for example, using a cryptographic algorithm before storage in the results folder 142. In some embodiments, the requested data that needs to be generated. For example, the remote server 103*a* may perform one or more operations or calculations in order to generate and store the requested data. Once the results are stored in the results folder 142 of the remote server 130*a*, the remote server 130*a* then gets notification of that file and moves it to the results folder of the respective relay server 102*b*. The relay server 102*a* receives an event of the new file in its results folder and moves it to the enterprise management system 101 (e.g., the enterprise server). The enterprise management system 101 detects an event of the newly received file in its results folder and queues it for processing into the central database.

In an operation 207, the remote server systems 103*a-f* push the data from respective results folders to a respective relay system 102*a* or 102*b*. For example, once the instructions have been executed or on a pre-determined schedule, the first remote server system 103 pushes the data in the results folder 142 to a results folder 142 of the first relay system 102*a*. In some embodiments, the remote server systems 103*a-f* may execute the instructions and gather the data into a folder or file and then move the folder or file to the results folder of the remote server system. For example, the remote server systems 103*a-f* may move the folder or file by updating a pointer change of the folder or file after executing all of the instructions. The move triggers the event that causes the remote server system to push the data to respective relay system 102*a* or 102*b*. In various embodiments, the move of the file being the trigger guarantees that the folder or file of data is fully written before the results folder is pushed to the respective relay system 102*a* or 102*b*. In some embodiments, the name of the results or data file (e.g., "DataInventory_MyFavoriteServer_2025_0951.tsv") may start with a keyword (e.g., "DataInventory") such that, when the file is received by the enterprise management system 101, the enterprise management system 101 is able to split the name by the underscore character (e.g., or other predetermined character) and determine a particular process (e.g., script or executable) to use for loading the data from the file into any (or multiple) of the central databases 190.

In some embodiments, a process may be scheduled on one or more of the remote server systems 103*a-f* to generate a results file on a pre-defined schedule. In this example, no computer readable instructions may have been retrieved from the respective relay system 102*a* or 102*b*. Instead, one or more of the remote server system 103*a-f* may automatically execute the process, generate the file or folder of data, move the file or folder of data to the results folder, and push the results folder to a respective results folder of the relay systems 102*a-b* that may then, in turn, push the file or folder of data to the enterprise management system.

In an operation 208, the relay systems 102*a-b* monitor the results folder of the respective relay system 102*a* or 102*b*. For example, the relay systems 102*a-b* may be operating an event listener service such as a windows event listener on its own results folder. Upon detecting that a results file from a remote server system 103*a-f* has been pushed into the results folder of the respective relay system 102*a-b*, the respective relay system 102*a* or 102*b* pushes the data from the local results folders to the enterprise management system 101 at process 209. For example, once the first relay system 102*a* receives the data from the first remote server system 103*a* or on a pre-determined schedule, the first relay system 102*a* pushes the results folder 142 to a results folder 142 of the enterprise management system 101. In some embodiments, the first relay system 102*a* may push the data received from each of the remote server systems 103*a-f* separately. In various embodiments, the first relay system 102*a* may push the results file to the results folder of the enterprise management system 101, move the data into a history folder on the first relay system 102*a*, store the data for a pre-determined amount of time (e.g., hours, days, etc.), and then purge or delete the data. In some embodiments, the results folder 142 of the first relay system 102*a* is deleted or purged immediately upon pushing the data to the enterprise management system 101. In some embodiments, the first relay system 102*a* may collect the data from two or more of the remote server systems 103*a-c* and aggregate the data within the results folder 142 before pushing the results file 142 to the enterprise computing device 101. In some embodiments, the first relay system 102*a* may place all received results within a FIFO queue and push the results folder to the enterprise management system 102 via multiple different threads or lines.

In an operation 210, the enterprise management system 101 processes the contents of the results folders pushed to the results folder of the enterprise management system 101. In some embodiments, the enterprise management system 101 monitors the results folder of the enterprise management system 101 and upon detecting that one or more results files from the relay systems 102*a-b* have been pushed to the enterprise management system 101, process the results. In some embodiments, the enterprise management system 101 places the received results into a queue (e.g., FIFO queue) and processes the contents of the received results folders one by one. In some embodiments, the enterprise management system 101 may include multiple processors or servers that assist in processing the queue. In some embodiments, some file types (e.g., determined based on a name of the file in the results folder) may be given priority and processed first. Depending on the type of file being received, a script or executable may be run to process the file. The results may then be loaded into a central database within the memory of the enterprise computing system 101. For example, data received may include particular data fields (e.g., requested in the instructions) with the particular values pushed to the enterprise management system 101. The particular data fields and corresponding values may be stored in an ordered structure within a database at the enterprise management system 101. The enterprise management system 101 may update the database based on future results or values of the particular data fields returned in order to maintain the database. The enterprise management system 101 may then be able to quickly and efficiently access the database in the future in order to run various applications and/or display the values to a user via a GUI that allows the user to more easily assess the current state and/or compliance of the computing device. In some embodiments, if the enterprise management system 101 is unable to determine a process for a particular file, the enterprise management system 101 may place the file into an error file and transmit a notification of the error to a user computing device (e.g., accessible via an administrator of the enterprise).

In some embodiments, the data of the central database of the enterprise management system 101 is stored in an structured query language (SQL) database to inventory the application data (e.g., parameters, size, features, etc.) of the remote servers 103*a-f*. The data of the SQL database may be stored in attributes instead of a traditional structure such as a table. The data received from the remote servers by performing method 200 may be received in rowsets and the enterprise computing system 101 then processes the row sets by breaking them up into attributes. The enterprise computing system 101 may then generate a table via querying the central database and assembling the queried attributes into a traditional rowset (e.g., table) format. Accordingly, the processing of received data by the enterprise computing system 101 and structure of the central database improves the dynamic ability and efficiency of presenting or analyzing the aggregated data.

Figure 3:
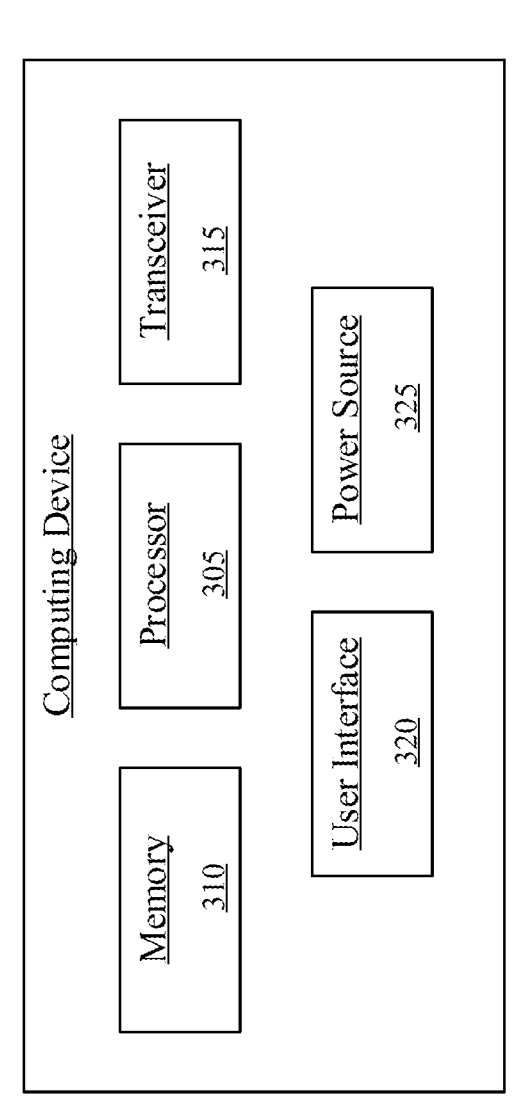
FIG. 3 is a block diagram of a computing device in accordance with an illustrative embodiment.

FIG. 3 is a block diagram of a computing device in accordance with an illustrative embodiment. An illustrative computing device 300 includes a memory 310, a processor 305, a transceiver 315, a user interface 320, and a power source 325. In alternative embodiments, additional, fewer, and/or different elements may be used. The computing device 300 can be any suitable device described herein. For example, the enterprise management system 101, the relay systems 102*a-b*, and the remote server systems 103*a-f* may each include one or more computing devices 300. The computing device 300 can be a desktop computer, a laptop computer, a smartphone, a server, a specialized computing device, etc. The computing device 300 can be used to implement one or more of the methods described herein.

In an illustrative embodiment, the memory 310 is an electronic holding place or storage for information so that the information can be accessed by the processor 305. The memory 310 can include, but is not limited to, any type of random access memory (RAM), any type of read only memory (ROM), any type of flash memory, etc. such as magnetic storage devices (e.g., hard disk, floppy disk, magnetic strips, etc.), optical disks (e.g., compact disk (CD), digital versatile disk (DVD), etc.), smart cards, flash memory devices, etc. The computing device 300 may have one or more computer-readable media that use the same or a different memory media technology. The computing device 300 may have one or more drives that support the loading of a memory medium such as a CD, a DVD, a flash memory card, etc. For example, the computer-readable media may include instructions thereon, that when executed, cause the one or more operations described in reference to FIGS. 1 and 2.

In an illustrative embodiment, the processor 305 executes instructions. The instructions may be carried out by a special purpose computer, logic circuits, or hardware circuits. The processor 305 may be implemented in hardware, firmware, software, or any combination thereof. The term "execution" is, for example, the process of running an application or the carrying out of the operation called for by an instruction. The instructions may be written using one or more programming language, scripting language, assembly language, etc. The processor 305 executes an instruction, meaning that it performs the operations called for by that instruction. The processor 305 operably couples with the user interface 320, the transceiver 315, the memory 310, etc. to receive, to send, and to process information and to control the operations of the computing device 300. The processor 305 may retrieve a set of instructions from a permanent memory device such as a ROM device and copy the instructions in an executable form to a temporary memory device that is generally some form of RAM. An illustrative computing device 300 may include a plurality of processors that use the same or a different processing technology. In an illustrative embodiment, the instructions may be stored in memory 310.

In an illustrative embodiment, the transceiver 315 is configured to receive and/or transmit information. In some embodiments, the transceiver 315 communicates information via a wired connection, such as an Ethernet connection, one or more twisted pair wires, coaxial cables, fiber optic cables, etc. In some embodiments, the transceiver 315 communicates information via a wireless connection using microwaves, infrared waves, radio waves, spread spectrum technologies, satellites, etc. The transceiver 315 can be configured to communicate with another device using cellular networks, local area networks, wide area networks, the Internet, etc. In some embodiments, one or more of the elements of the computing device 300 communicate via wired or wireless communications. In some embodiments, the transceiver 315 provides an interface for presenting information from the computing device 300 to external systems, users, or memory. For example, the transceiver 315 may include an interface to a display, a printer, a speaker, etc. In an illustrative embodiment, the transceiver 315 may also include alarm/indicator lights, a network interface, a disk drive, a computer memory device, etc. In an illustrative embodiment, the transceiver 315 can receive information from external systems, users, memory, etc.

In an illustrative embodiment, the user interface 320 is configured to receive and/or provide information from/to a user. The user interface 320 can be any suitable user interface. The user interface 320 can be an interface for receiving user input and/or machine instructions for entry into the computing device 300. The user interface 320 may use various input technologies including, but not limited to, a keyboard, a stylus and/or touch screen, a mouse, a track ball, a keypad, a microphone, voice recognition, motion recognition, disk drives, remote controllers, input ports, one or more buttons, dials, joysticks, etc. to allow an external source, such as a user, to enter information into the computing device 300. The user interface 320 can be used to navigate menus, adjust options, adjust settings, adjust display, etc.

The user interface 320 can be configured to provide an interface for presenting information from the computing device 300 to external systems, users, memory, etc. For example, the user interface 320 can include an interface for a display, a printer, a speaker, alarm/indicator lights, a network interface, a disk drive, a computer memory device, etc. The user interface 320 can include a color display, a cathode-ray tube (CRT), a liquid crystal display (LCD), a plasma display, an organic light-emitting diode (OLED) display, etc.

In an illustrative embodiment, the power source 325 is configured to provide electrical power to one or more elements of the computing device 300. In some embodiments, the power source 325 includes an alternating power source, such as available line voltage (e.g., 120 Volts alternating current at 60 Hertz in the United States). The power source 325 can include one or more transformers, rectifiers, etc. to convert electrical power into power useable by the one or more elements of the computing device 300, such as 1.5 Volts, 8 Volts, 12 Volts, 24 Volts, etc. The power source 325 can include one or more batteries.

In an illustrative embodiment, any of the operations described herein can be implemented at least in part as computer-readable instructions stored on a computer-readable memory. Upon execution of the computer-readable instructions by a processor, the computer-readable instructions can cause a computing device to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A computing device configured to run an application in order to provide a product or service to one or more customers comprising:
a transceiver configured to communicably couple the computing device to a network;
a memory having application data relating to one or more customers stored thereon; and
a processor operatively coupled to the memory and the transceiver, the processor configured to:
monitor an instructions folder of a second computing device on the network to detect a file including computer-executable instructions using a port of the network through a security zone accessible for communications initiated by the computing device and not the second computing device;
in response to detecting the file including the computer-executable instructions within the instructions folder, pull the computer-executable instructions from the instructions folder of the second computing device;
execute the computer-executable instructions pulled from the instructions folder to determine a subset of the application data relating to the one or more customers, the subset comprising a plurality of data fields including personal information of the one or more customers;
determine a corresponding value for each of the plurality of data fields using the subset of the application data determined via the execution of the computer-executable instructions; and
push the subset of the application data to a results folder in the second computing device using the port, the results folder and the instructions folder disposed in a file structure of the second computing device.

2. The computing device of claim 1, wherein the computer-executable instructions are pulled at a first pre-determined time based on a pre-determined schedule.

3. The computing device of claim 2, wherein to pull the computer-executable instructions, the processor is further configured to identify the second computing device based on a stored network identifier of the second computing device and retrieve the computer-executable instructions from a file share data structure of the second computing device.

4. The computing device of claim 1, wherein the computer-executable instructions include instructions in a JavaScript Object Notation (JSON) format.

5. The computing device of claim 1, wherein to pull the computer-executable instructions, the processor is further configured to open the port through the security zone on the network to the second computing device.

6. The computing device of claim 5, wherein the second computing device does not push or pull data to the computing device.

7. The computing device of claim 1, wherein the processor is further configured to:
store the values corresponding to the plurality of data fields within a first folder of the memory, wherein the first folder of the memory is pushed to the second computing device; and
in response to pushing the first folder, removing the values from the first folder.

8. The computing device of claim 1, wherein to determine the values, the processor is further configured to:
identify the plurality of data fields based on the computer-executable instructions; and
access one or more of the values from respective data fields stored within a database of the memory.

9. The computing device of claim 1, wherein to determine the values, the processor is further configured to:
identify, based on the computer-executable instructions, that a first value corresponding to a first of the data fields needs to be generated; and
execute a portion of the computer-executable instructions to generate the first value.

10. The computing device of claim 1, wherein the second computing device is configured to push the subset of the application data from the results folder to a third computing device, wherein the second computing device received at least a portion of the computer-executable instructions pulled from the instructions folder from the third computing device.

11. The system of claim 1, wherein, to monitor the instructions folder, the processor implements at least one of a polling service or an event listener service.

12. A system comprising:
a first computing device comprising:
a first transceiver configured to communicably couple the first computing device to a network;
a first memory; and
a first processor operatively coupled to the first memory and the first transceiver, the first processor configured to:
pull, using a port of the network through a security zone accessible for communications initiated by the first computing device and not a second computing device, a first file including computer-executable instructions from a third computing device on the network upon its detection;
identify a plurality of data fields requested by the computer-executable instructions of the first file pulled from the third computing device;
determine that one or more of the data fields requested by the computer-executable instructions is inaccessible to the first computing device; and store the computer-executable instructions within a second file of the first memory responsive to the determination of inaccessibility; and the second computing device comprising:

a second transceiver configured to communicably couple the second computing device to the network;

a second memory having application data relating to one or more customers stored thereon; and a second processor operatively coupled to the second memory and the second transceiver, the second processor configured to:

pull the computer-executable instructions from the second file of the first computing device;

determine a corresponding value for the one or more of the data fields determined to be inaccessible to the first computing device using the application data responsive to the determination of inaccessibility; and push the corresponding values to the first computing device responsive to the corresponding value.

13. The system of claim 12, wherein the second computing device is positioned within a security zone of the network, and wherein the second computing device is configured to provide a service to one or more customers.

14. The system of claim 12, further comprising the third computing device, the third computing device comprising:

a third transceiver configured to communicably couple the first computing device to the network;

a third memory; and a third processor operatively coupled to the first memory and the first transceiver, the third processor configured to:

determine the computer-executable instructions based on at least one of a received request or a pre-determined schedule; and store the computer-executable instructions within a third file within the third memory, wherein the first computing device is configured to pull the computer-executable instructions from the third file using a second port of the network through a second security zone accessible for communications initiated by the third computing device and not the second computing device.

15. The system of claim 14, wherein the computer-executable instructions are configured to, upon execution, aggregate data from computing devices throughout the system without the third computing device transmitting a request to the computing devices throughout the network.

16. The system of claim 15, wherein the second computing device is configured to pull the computer-executable instructions from the second file on a second pre-determined schedule.

17. The system of claim 12, wherein the computer-executable instructions include instructions in a JavaScript Object Notation (JSON) format.

18. The system of claim 12, wherein the first computing device is not configured to push or pull data from the second computing device, and the second computing device is not configured to push or pull data from the third computing device.

19. A computer-implemented method comprising:

monitoring, by a first computing device, an instructions folder for a file including computer-executable instructions executable by a third computing device in an instructions folder using a port of a network through a security zone accessible for communications initiated by the first computing device, the instructions including an indication of requested data, the requested data comprising personal information;

pulling, by a second computing device from the first computing device, the computer-executable instructions from the instructions folder in response to the detection of the computer-executable instructions within the instructions folder;

pulling, by the third computing device from the second computing device, the computer-executable instructions from the predetermined location in a file structure responsive to the pulling of the computer-executable instructions by the second computing device;

determining, by the third computing device, values for the requested data based on the instructions;

pushing, by the third computing device to the second computing device, the values responsive to the determination of the values; and pushing the values, by the second computing device, to the first computing device responsive to the determination of the values.

20. The method of claim 19, wherein the computer-executable instructions include instructions in a JavaScript Object Notation (JSON) format to retrieve personal information of one or more customers from application data.

21. The method of claim 20, wherein the first computing device does not push or pull data from the second computing device, and the second computing device does not push or pull data from the third computing device.

\* \* \* \* \*